March 29, 1927.
I. M. MUINCH
JELLY STRAINER
Filed Aug. 4, 1925
1,622,800
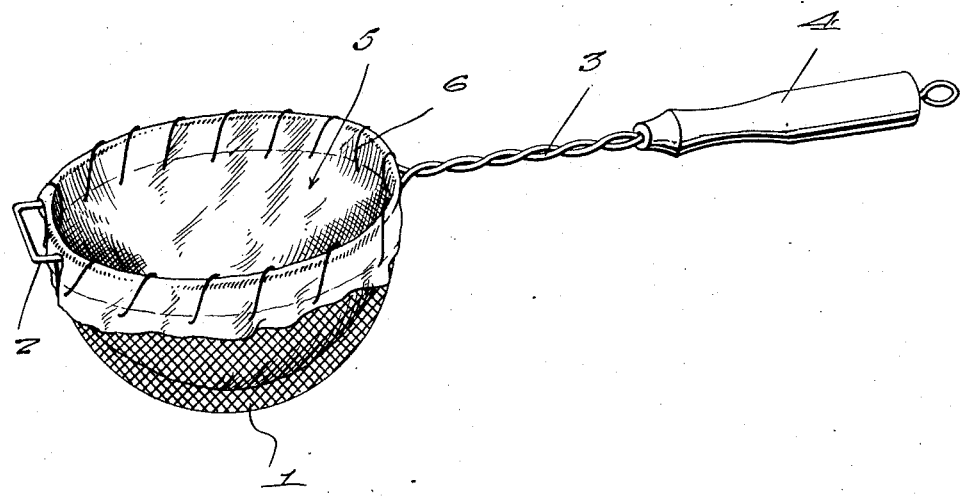
Inventor
I. M. Muinch
By Clarence A. O'Brien
Attorney Patented Mar. 29, 1927.

1,622,800

UNITED STATES PATENT OFFICE.

IDA M. MUINCH, OF ROCKPORT, MISSOURI.

JELLY STRAINER.

Application filed August 4, 1925. Serial No. 48,094.

This invention relates to an improved strainer, and it has particular reference to one designed particularly for straining jelly in the final step of pouring the same into the glasses to set and harden.

Various recipes have been formulated, and are set out in cook books and the like for enabling the making of clear jelly. It has been my pleasure to seek and experiment with all accessible recipes in the endeavor to produce a jelly which is far beyond any so far produced, particularly with respect to clarity.

It has been frequently suggested that the clearness of the finished product resides more particularly in the process followed in the making of the same. While this may be true, to an outstanding degree, it is my belief that a predominating degree of clearness in the finished product will be brought about by the introduction of an improved step in the straining of the jelly while it is still in a liquid state, and at the time it is poured into the glasses to set.

My inventive conception resides in the provision of an improved strainer and in the utilization of a new step in the final treatment of the product, and both of these become evident from a careful consideration of the following description and drawing.

In the accompanying drawing forming a part of this application and in which like numerals are employed to designate like parts throughout the same:

The figure is a perspective of a strainer constructed in accordance with the present invention.

Referring to the drawing it will be seen that the reference character 1 designates a substantially semi-globular strainer of reticulated material which is provided at its top with a rim carrying a rest 2, and a twisted wire handle 3, in turn provided with a wooden hand grip 4. Fitted within this strainer is a fabric filter 5, which is preferably in the form of a piece of cheese cloth fastened over the rim of the strainer by stitches 6. It will be noted that the cheese cloth is so placed that the bottom of the same is spaced from the bottom of the strainer so as to provide a clearance space desirable in efficient straining.

In accordance with my idea the strainer proper is about the size of what is commonly known as a tea strainer. This type of a strainer is exceedingly desirable in that it will fit down into the ordinary jelly glass to facilitate pouring of the jelly. Under this arrangement, as the liquid jelly is poured it is first filtered by the porous cheese cloth, then again strained when passing through the interstices of the strainer. This double straining action is in itself sufficient to remove particles which would otherwise tend to render the finished product somewhat unclear. An important step in the process however is that the cloth covered strainer is to be dipped into hot or boiling water, then immediately placed on top of the glass, jar, or other receiver, after which the liquid jelly is poured therethrough. The steaming and heated filter and strainer thus produce an unusual effect, and experience has shown that the product is "clear as a crystal", so to speak. After one or more glasses have been filled, the strainer is again dipped into the hot water, and agitated therein in a manner to remove the impurities which have collected thereon. This renders the device ready for use with the next glass.

From the foregoing description and drawing it is obvious that the gist of the invention resides in the utilization of a common marketed tea strainer highly adaptable for use in association with the jelly glasses, and particularly desirable for use in the instance specified in that it may be conveniently handled when placing the device in the hot water to accomplish the efficient straining specified. This, together with the permanent, yet renewable fabric in the spaced association with the metallic foraminous material, and held in place by common stitches, is productive of an article which is highly adaptable for the heating and flushing or cleansing operation stated. The fabric is highly porous, and yet flexible, and capable of being literally turned inside out so that it may be relieved of small particles that would otherwise collect and adhere thereto.

A careful consideration of the description in connection with the drawings will no doubt suffice to enable a clear understanding of the invention to be had. Therefore, a more lengthy description is thought unnecessary.

While the preferred embodiment of the invention has been shown and described it is to be understood that minor changes coming within the field of invention claimed may be resorted to if desired.

Having thus described the invention, what I claim as new and desire to secure by Letters Patent is:—

A device for use in the making of jelly, comprising a rim, a handle fixedly connected to and extending radially from the rim, a semi-globular portion of reticulated material carried by and pendent from the rim, a straining cloth dished within the rim and portion of reticulated material and draped over the rim and having an exterior portion pendent at the outer side of the rim and reticulated portion, and a thread stitched or passed above the rim and through opposed portions of the straining cloth and also through interstices of the reticulated portion, whereby the straining cloth is maintained in working position with its bottom above and in spaced relation to the bottom of the reticulated portion.

In testimony whereof I affix my signature.

IDA M. MUINCH.